Patented Feb. 25, 1947

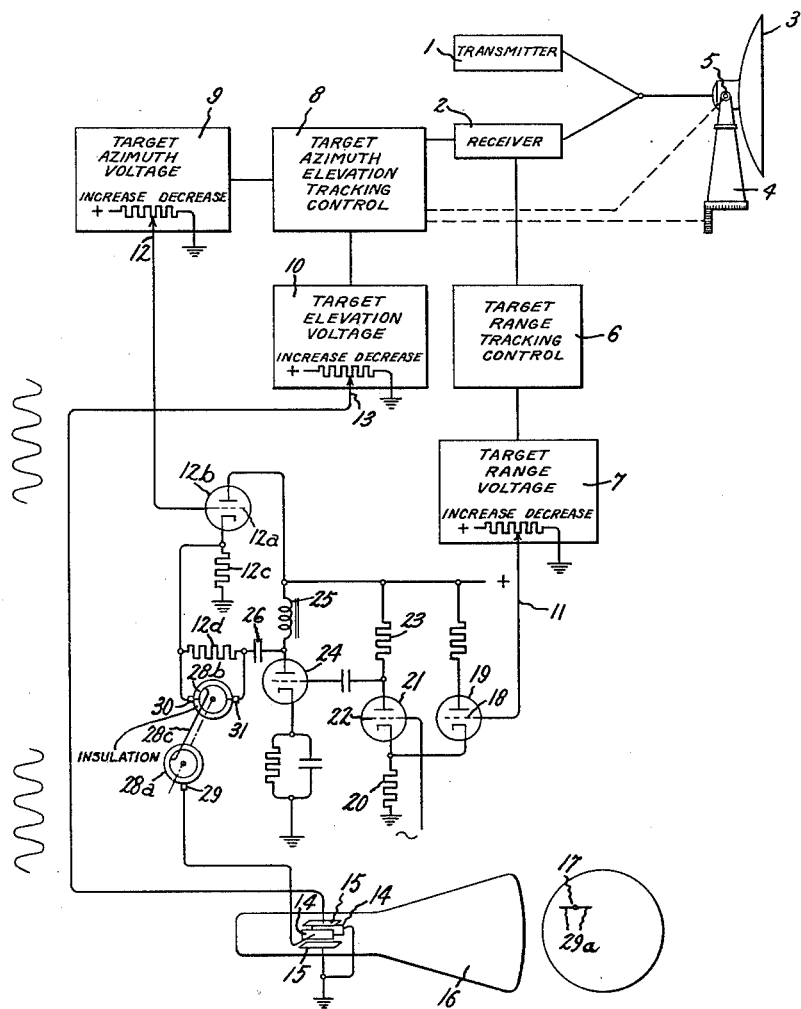

2,416,591

UNITED STATES PATENT OFFICE 2,416,591

RADAR LOCATING EQUIPMENT

William E. Muntz and James F. Wilcox, Schenectady, N. Y., assignors to General Electric Company, a corporation of New York Application April 15, 1944, Serial No. 531,274

5 Claims. (Cl. 250—1.62)

1

The present invention relates to locating equipment for determining the direction and range of a target and is particularly concerned with the production of a composite image representing the target position and range. The portion of the image representing range may take the form of horizontal traces simulating airplane wings.

An object of our invention is to provide an improved arrangement for producing a representation of target position and range.

The novel features which we believe to be characteristic of our invention are set forth with particularity in the appended claims. Our invention itself, however, both as to its organization and method of operation, together with further objects and advantages thereof, may best be understood by reference to the following description taken in connection with the accompanying drawing in which the single figure is a diagram of equipment embodying our invention.

Referring to the drawing, there is shown radio locating equipment having a transmitter 1 for transmitting pulses of radio waves at the desired repetition rate and a receiver 2 connected to a directional antenna 3 supported at 4 and 5 for movement in azimuth and elevation so that the antenna can be directed toward a target. The echoes of the transmitted pulse, which arrive at the antenna from the target at times dependent upon the target range, are fed through target range tracking control equipment indicated at 6 producing a target range voltage, indicated at 7 as a D.-C. voltage proportional to target range. By means of a target elevation and azimuth tracking control, indicated at 8, the antenna azimuth and elevation are controlled so the antenna is maintained directed at the target during any movements thereof and voltages indicated at 9 and 10 are produced proportional to target azimuth and elevation. These voltages are represented at D.-C. voltages proportional respectively to the target azimuth and elevation. The target tracking controls are not part of the present invention and accordingly are not illustrated in detail. In so far as the operation of the equipment is concerned, the voltages proportional to target range, azimuth, and elevation may be obtained by manually adjusting potentiometers 11, 12, 13. The azimuth and elevation tracking controls 8 may comprise equipments of the type disclosed in copending application, Serial No. 496,740, filed July 30, 1943, by Sidney Godet, and the target range tracking control may be of the type disclosed in application, Serial No. 400,080, filed January 27, 1941,

2 by William C. Hahn. These applications are assigned to the same assignee as our present application.

The target azimuth and elevation voltages are applied respectively to horizontal and vertical deflection plates 14, 15 of a cathode ray tube 16 producing on the viewing screen a spot 17 representing the coordinate position of the target with respect to the horizontal and vertical axes. The elevation voltage is applied directly to the plates 15. The azimuth voltage is applied to the grid 12a of a device 12b having a cathode resistor 12c connected through a high resistance 12d to the plates 14. The purpose of the device 12b is to provide a low impedance (12c) across which the azimuth voltage appears. If the equipment is mounted on an airplane, the longitudinal axis of the airplane may be represented as the center of the viewing screen in which case the target azimuth and elevation will be measured from the longitudinal axis of the airplane rather than from true horizontal and vertical.

The target range voltage is fed to the grid 18 of a device 19 causing a bias in a cathode resistor 20 proportional to target range. The resistor 20 is connected in the cathode circuit of an amplifier 21 having a control grid 22 connected to a suitable A.-C. supply, e. g., 400 cycles. The amplifier output, which appears across a plate resistor 23, is a 400-cycle voltage having a magnitude varying inversely with the bias on the cathode resistor 20, or, in other words, inversely with the target range. The output of the amplifier 21 is further amplified in a device 24 having an inductance 25 in its plate circuit across which appears a 400-cycle voltage having a magnitude varying inversely with the target range. From one aspect, the gain of the amplifiers 21 and 24 is controlled inversely with the target range. The 400-cycle range voltage appearing across the inductance 25 is connected through a condenser 26 and the high resistance 12d to the cathode resistor 12c. The resistances 12c and 12d serve as a voltage divider and since the resistance 12c is small compared to the resistance 12d (e. g., 1/1000) substantially all of the 400-cycle range voltage appears across the resistance 12d. The target azimuth and range voltages are applied to the horizontal deflection plates 14 through a rotary switch or commutator having a slip ring 28a and a commutator segment 28b electrically connected by a conductor 28c. The slip ring 28a is connected by a brush 29 to the deflection plates 14. The commutator segment 28b is connected alternately to opposite ends of the resistance 12d by brushes 30 and 31 spaced so that one or the other is always in contact with the segment. If both brushes simultaneously contact the segment, no harm is done; the 400-cycle voltage is short-circuited, but the azimuth deflection voltage remains holding the beam steady. If neither brush is in contact with the segment, there is a possibility of erratic modulation of the beam position. The commutator is rotated at a speed of 40-50 revolutions/second and the length of the segment 28b is such that the brushes 30 and 31 are alternately connected to the resistance 12d about 50% of each revolution. While the brush 31 is connected to the segment 28b, four or five cycles of the 400-cycle voltage appearing in the inductance 25 are impressed on the resistance 12d and added to the target azimuth voltage to produce a combined deflecting voltage centered on the target azimuth. When the brush 30 is connected to the segment 28b, a negligible amount of the 400-cycle voltage (that appearing across the resistance 12c) is impressed on the deflection plates 14. The target azimuth voltage is always impressed on the deflection plates 14 through one of the brushes 30, 31. The resultant image on the viewing screen consists of superimposed spots 17 representing the target position and horizontal traces 29a centered on the spots 17 and having a length inversely proportional to target range. The spots 17 and range traces 29a occur successively at a rate (40-50 cycles/second) such that a composite image is produced on the viewing screen. Due to the sinusoidal wave form of the A.-C. voltages from which the target range traces are obtained, the ends of the traces which represent the magnitude of the ranges are well defined since the beam of the cathode ray tube dwells at the ends of the range traces. The speed of rotation of the commuator and the proportion of the time brushes 30, 31 are connected to the segment 28b are not critical, it merely being necessary that the switching rate be low compared to the frequency of the A.-C. range voltage at the inductance 25 and high enough so that a composite image is produced on the viewing screen. Because resistance 12c is low compared to the resistance 12d, there is no problem of synchronizing the commutator with the A.-C. range voltage since one or more cycles of the A.-C. range voltage are applied to the deflection plates 14 during each rotation of the commutator. Ideally, the commutator should be synchronized with the A.-C. range voltage so that the brush 31 is connected to the segment 28b at points of zero voltage 360 degrees apart. Practically this does not seem necessary. The resultant equipment is therefore simple and rugged and requires no precise adjustments.

While we have shown particular embodiments of our invention, it will be understood that many modifications may be made without departing from the spirit thereof, and we contemplate by the appended claims to cover any such modifications as fall within the true spirit and scope of our invention.

What we claim as new and desire to secure by Letters Patent of the United States is:

1. In locating equipment having provisions for locating a target in angular direction in a given plane and in range, a cathode ray device having a viewing screen, means for illuminating a point on said screen, means to vary the position of said point along a line on said screen corresponding to the angular direction of said target in said plane, said means including means to supply to the cathode ray device a deflecting voltage proportional to the target direction, means producing an alternating voltage proportional to target range, means for adding said voltages to obtain a combined deflecting voltage centered on the target direction and varying from the target direction in accordance with target range, and switching means for supplying said alternating range voltage intermittently to said cathode ray device whereby the illuminated point on the screen successively assumes a position representing target direction and traces a path on opposite sides of said position representing target range, the switching rate being such as to produce a persistent image representing target direction and range, and the intervals of connection of the range voltage including one or more cycles of the range voltage.

2. In locating equipment having provisions for producing voltages proportional to target azimuth, elevation and range, the range voltage being alternating, a cathode ray tube having azimuth and elevation deflection plates, means to supply said voltages proportional to azimuth and elevation to said azimuth and elevation deflecting plates respectively, a voltage divider having its high side coupled to the target range voltage, said divider having at its low side a relatively low impedance coupled to the target azimuth voltage across which a negligible amount of the range voltage appears, a commutator having a segment connected to the azimuth deflection plates, and a pair of brushes arranged to consecutively contact the segment during rotation of the commutator and so that one is always in contact with the segment, one of the brushes being connected to the high side of the voltage divider and the other being connected to the high side of said low impedance whereby the cathode ray beam is alternately deflected on opposite sides of the target azimuth to produce a trace representing target range.

3. In locating equipment having provisions for locating a target in direction and range, a cathode ray tube having horizontal and vertical deflection plates and a viewing screen, means to supply horizontal and vertical deflecting voltages to said deflection plates proportional to the horizontal and vertical components of the target direction respectively to produce a spot on the viewing screen positioned to represent the target position, means producing an alternating voltage proportional to target range, a voltage divider having its high side coupled to said alternating voltage producing means and having a point at its low side at which a negligible amount of the alternating voltage appears coupled to the horizontal deflection voltage supply means, and a commutator for alternately connecting the high side and said point on the voltage divider to the horizontal deflection plates without breaking the circuit to the voltage divider whereby a composite image is produced on the screen consisting of said spot representing target position and a horizontal trace on opposite sides of said spot representing target range.

4. The combination, in a target locating system, of a cathode ray device having a viewing screen, means to deflect the ray of said device over said screen in accord with the position of a remote target, said means comprising means to supply to said cathode ray device two unidirectional voltages one varying in accord with the azimuth and the other in accord with the elevation of the target to deflect said ray over said screen in corresponding directions, and means intermittently to superpose upon one of said voltages an alternating voltage varying with the range to said target whereby said ray produces a spot on said screen from which it is deflected in opposite directions during intermittent intervals by said alternating voltage to produce oppositely extending projections of length dependent on said range.

5. The combination, in a target locating system, a cathode ray device having a viewing screen, means to deflect the ray of said device over said screen in accord with the position of a remote target, said means comprising means to supply to said cathode ray device two unidirectional voltages one varying in accord with the azimuth and the other in accord with the elevation of the target to deflect said ray over said screen in corresponding directions, means to produce an alternating voltage varying in accord with the range of said target, and mechanical means to supply said alternating voltage at intermittent intervals to said cathode ray device with one of said first mentioned voltages thereby to deflect the ray across said screen through the spot determined by the first two mentioned voltages to produce projections on said spot of length corresponding to said range.

WILLIAM E. MUNTZ.
JAMES F. WILCOX.

REFERENCES CITED

The following references are of record in the file of this patent:

UNITED STATES PATENTS

| Number | Name | Date |
| --- | --- | --- |
| 2,231,929 | Lyman | Feb. 18, 1941 |